(12) United States Patent
Zhang et al.

(10) Patent No.: US 10,516,830 B2
(45) Date of Patent: Dec. 24, 2019

(54) GUIDED IMAGE COMPOSITION ON MOBILE DEVICES

(71) Applicant: Adobe Inc., San Jose, CA (US)

(72) Inventors: Jianming Zhang, Boston, MA (US); Zijun Wei, Stoneybrook, NY (US); Zhe Lin, Fremont, CA (US); Xiaohui Shen, San Jose, CA (US); Radomir Mech, Mountain View, CA (US)

(73) Assignee: Adobe Inc., San Jose, CA (US)

( * ) Notice: Subject to any disclaimer, the term of this patent is extended or adjusted under 35 U.S.C. 154(b) by 22 days.

(21) Appl. No.: 15/730,614

(22) Filed: Oct. 11, 2017

(65) Prior Publication Data
US 2019/0109981 A1   Apr. 11, 2019

(51) Int. Cl.
*H04N 5/232* (2006.01)
*G06N 3/08* (2006.01)

(52) U.S. Cl.
CPC ... *H04N 5/232935* (2018.08); *H04N 5/23222* (2013.01); *H04N 5/23229* (2013.01); *H04N 5/23293* (2013.01); *G06N 3/08* (2013.01)

(58) Field of Classification Search
CPC ......... H04N 5/232935; H04N 5/23222; H04N 5/23293; H04N 5/23229; G06N 3/08
USPC ........................... 348/333.05, 333.11, 333.12
See application file for complete search history.

(56) References Cited

U.S. PATENT DOCUMENTS

| | | | |
|---|---|---|---|
| 8,547,469 B2* | 10/2013 | Ejima | H04N 5/772 348/333.11 |
| 9,325,899 B1 | 4/2016 | Chou | |
| 9,836,484 B1* | 12/2017 | Bialynicka-Birula | G06F 17/3028 |
| 10,075,653 B2* | 9/2018 | Jeong | H04N 5/2621 |
| 10,083,378 B2* | 9/2018 | Chakraborty | G06K 9/66 |
| 2006/0171703 A1* | 8/2006 | Abe | H04N 1/3875 396/311 |
| 2007/0140675 A1* | 6/2007 | Yanagi | G03B 17/04 396/88 |
| 2007/0146528 A1* | 6/2007 | Yanagi | H04N 1/3875 348/333.01 |

(Continued)

OTHER PUBLICATIONS

Chen, Yi-Ling, et al., "Learning to Compose With Professional Photographs on the Web", arXiv preprint arXiv:1702.00503, Feb. 2017, 10 pages.

(Continued)

*Primary Examiner* — Albert H Cutler
(74) *Attorney, Agent, or Firm* — Kilpatrick Townsend & Stockton LLP

(57) ABSTRACT

Various embodiments describe facilitating real-time crops on an image. In an example, an image processing application executed on a device receives image data corresponding to a field of view of a camera of the device. The image processing application renders a major view on a display of the device in a preview mode. The major view presents a previewed image based on the image data. The image processing application receives a composition score of a cropped image from a deep-learning system. The image processing application renders a sub-view presenting the cropped image based on the composition score in a preview mode. Based on a user interaction, the image processing application renders the cropped image in the major view with the sub-view in the preview mode.

19 Claims, 10 Drawing Sheets

(56) References Cited

U.S. PATENT DOCUMENTS

| | | | | |
|---|---|---|---|---|
| 2007/0291154 | A1* | 12/2007 | Moon | H04N 5/23248 348/333.05 |
| 2008/0052945 | A1* | 3/2008 | Matas | G06F 3/0485 34/173 |
| 2008/0068487 | A1* | 3/2008 | Morita | G03B 13/00 348/333.05 |
| 2008/0192129 | A1* | 8/2008 | Walker | G11B 27/034 348/231.2 |
| 2008/0240563 | A1* | 10/2008 | Takano | H04N 5/23219 382/173 |
| 2014/0184848 | A1* | 7/2014 | Shimosato | H04N 5/23293 348/223.1 |
| 2014/0204244 | A1* | 7/2014 | Choi | H04N 5/23222 348/231.99 |
| 2014/0351264 | A1* | 11/2014 | Murray | G06F 17/30247 707/748 |
| 2015/0084951 | A1 | 3/2015 | Boivin | |
| 2015/0170405 | A1 | 6/2015 | Hu | |
| 2016/0073034 | A1* | 3/2016 | Mukherjee | H04N 5/23293 348/333.11 |
| 2016/0080643 | A1* | 3/2016 | Kimura | H04N 5/23206 348/207.1 |
| 2017/0118401 | A1* | 4/2017 | Yim | G06F 3/04842 |
| 2017/0118413 | A1* | 4/2017 | Shin | G06F 3/14 |
| 2017/0132526 | A1 | 5/2017 | Cohen | |
| 2017/0178289 | A1 | 6/2017 | Zhang | |
| 2017/0257576 | A1* | 9/2017 | Mitsui | H04N 5/272 |
| 2017/0278546 | A1 | 9/2017 | Xiao | |
| 2017/0294010 | A1* | 10/2017 | Shen | G06T 7/0002 |
| 2018/0032031 | A1 | 2/2018 | Du | |
| 2018/0357501 | A1* | 12/2018 | Ma | G06K 9/00288 |

OTHER PUBLICATIONS

Cheng, Bin, et al., "Learning to Photograph" In Proceedings of the 18th ACM international conference on Multimedia, pp. 291-300. ACM, 2010, 10 pages.

Erhan, Dumitru, et al., "Scalable Object Detection Using Deep Neural Networks", In Proceedings of the IEEE Conference on Computer Vision and Pattern Recognition, 2014, 8 pages.

Girshick, Ross, et al., "Fast r-cnn", In Proceedings of the IEEE International Conference on Computer Vision, 2015, 9 pages.

He, Kaiming, et al., "Spatial Pyramid Pooling in Deep Convolutional Networks for Visual Recognition", In European Conference on Computer Vision, Springer, 2014, arXiv:1406.4729v4, Apr. 23, 2015, 14 pages.

Kang, Le, et al., "Convolutional Neural Networks for No-Reference Image Quality Assessment", In Proceedings of the IEEE Conference on Computer Vision and Pattern Recognition, 2014, 8 pages.

Kong, Shu, et al., "Photo Aesthetics Ranking Network With Attributes and Content Adaptation", In European Conference on Computer Vision, Springer, 2016, arXiv:1606.01621v2, Jul. 27, 2016, 24 pages.

Liu, Ligang, et al. "Optimizing Photo Composition", In Computer Graphics Forum, vol. 29, Issue 2, Wiley Online Library, Computer Graphics Forum 2010, 12 pages.

Lu, Xin, et al., Rapid: Rating Pictorial Aesthetics Using Deep Learning, In Proceedings of the 22nd ACM international conference on Multimedia, ACM, 2014, 10 pages.

Lu, Xin, et al., "Deep Multi-Patch Aggregation Network for Image Style, Aesthetics, and Quality Estimation", In Proceedings of the IEEE International Conference on Computer Vision, 2015, 9 pages.

Park, Jaesik, et al., "Modeling Photo Composition and Its Application to Photo Rearrangement" In Image Processing (ICIP), 2012 19th IEEE International Conference, IEEE, 2012, 4 pages.

Szegedy, Christian, et al., "Going Deeper with Convolutions", In Proceedings of the IEEE Conference on Computer Vision and Pattern Recognition, 2015, 9 pages.

Yan, Jianzhou, et al, "Learning the Change for Automatic Image Cropping", In Proceedings of the IEEE Conference on Computer Vision and Pattern Recognition, 2013, 8 pages.

Zhang, Minghu, et al., "Auto Cropping for Digital Photographs", In Multimedia and Expo, 2005, ICME 2005, IEEE International Conference, IEEE, 2005, 4 pages.

Ma, Shuang, et al., "Pose maker: A pose recommendation system for person in the landscape photographing", In Proceedings of the 22nd ACM international conference on Multimedia, ACM, 2014, 4 pages.

Xu, Yan, et al., "Real-Time Guidance Camera Interface to Enhance Photo Aesthetic Quality", In Proceedings of the 33rd Annual ACM Conference on Human Factors in Computing Systems, ACM, 2015.

Yao, Lei, et al, "Oscar: On-Site Composition and Aesthetics Feedback Through Exemplars for Photographers", International Journal of Computer Vision, 96(3), 2012.

* cited by examiner

GUIDED IMAGE COMPOSITION ON MOBILE DEVICES

TECHNICAL FIELD

This disclosure relates generally to image processing. More specifically, but not by way of limitation, this disclosure relates to an image processing application that uses a deep-learning system to guide image composition and recommend image crops in real-time.

BACKGROUND

More and more people are using mobile devices, e.g. smart phones and tablets, to take everyday images. But despite the convenience, achieving good image, or photo composition, on mobile devices is not always easy for a variety of reasons. For example, a mobile device user may lack experience with photography or not have the time to practice.

Composition refers to the way various elements in a scene are arranged within an image such as a photograph. Composition guidance refers to the process of helping a user identify how to take an image with better composition. For example, a user may take an image of a subject but crop the image in such a way as to obscure the subject's face or position the subject awkwardly with respect to objects in the background, thereby causing a less-than-ideal composition. Similarly, a user may zoom in or zoom out in such a way that the composition of the image suffers.

User interfaces and computing devices may help a person take a better photo. But existing solutions for composition guidance using mobile devices do not fulfill the combined needs of responsive feedback, intuitive user-interface interactions, and straightforward information presentation to users. Moreover, existing solutions may not make efficient use of computing resources. For example, existing solutions may improve the composition of an image such as an image via edits such as cropping or zooming. But the taking and storing of an ultimately discarded image wastefully consumes resources such as processing power, memory, cache, and consumes power. Moreover, existing solutions may be cumbersome for the user. For example, existing solutions may not perform the edits in real-time. Accordingly, because of the time a user may take to perform this experimentation, the user may not be able to update, or retake, the original picture. The desired scene and subject may be lost and the user may not be able to obtain consistent results.

Accordingly, real-time solutions are needed to help users of mobile devices quickly and easily improve the composition of their photographs using their mobile devices.

SUMMARY

Various embodiments of the present disclosure describe an image processing application that uses a deep-learning system to guide image composition and recommend image crops in real-time. In an example, the image processing application is executed on a device and receives image data corresponding to a field of view of a camera of the device. The image data is received in a preview mode of the image processing application. The image processing application further renders a major view on a display of the device in a preview mode. The major view presents a previewed image based on the image data. The image processing application receives a composition score of a cropped image. The cropped image is generated by cropping the previewed image and the composition score is generated by a deep-learning system. The image processing application renders a sub-view presenting the cropped image based on the composition score in the preview mode. The image processing application renders the cropped image in the major view based on a user interaction with the sub-view in the preview mode.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE FIGURES

Features, embodiments, and advantages of the present disclosure are better understood when the following Detailed Description is read with reference to the accompanying drawings.

DETAILED DESCRIPTION

Figure 1:
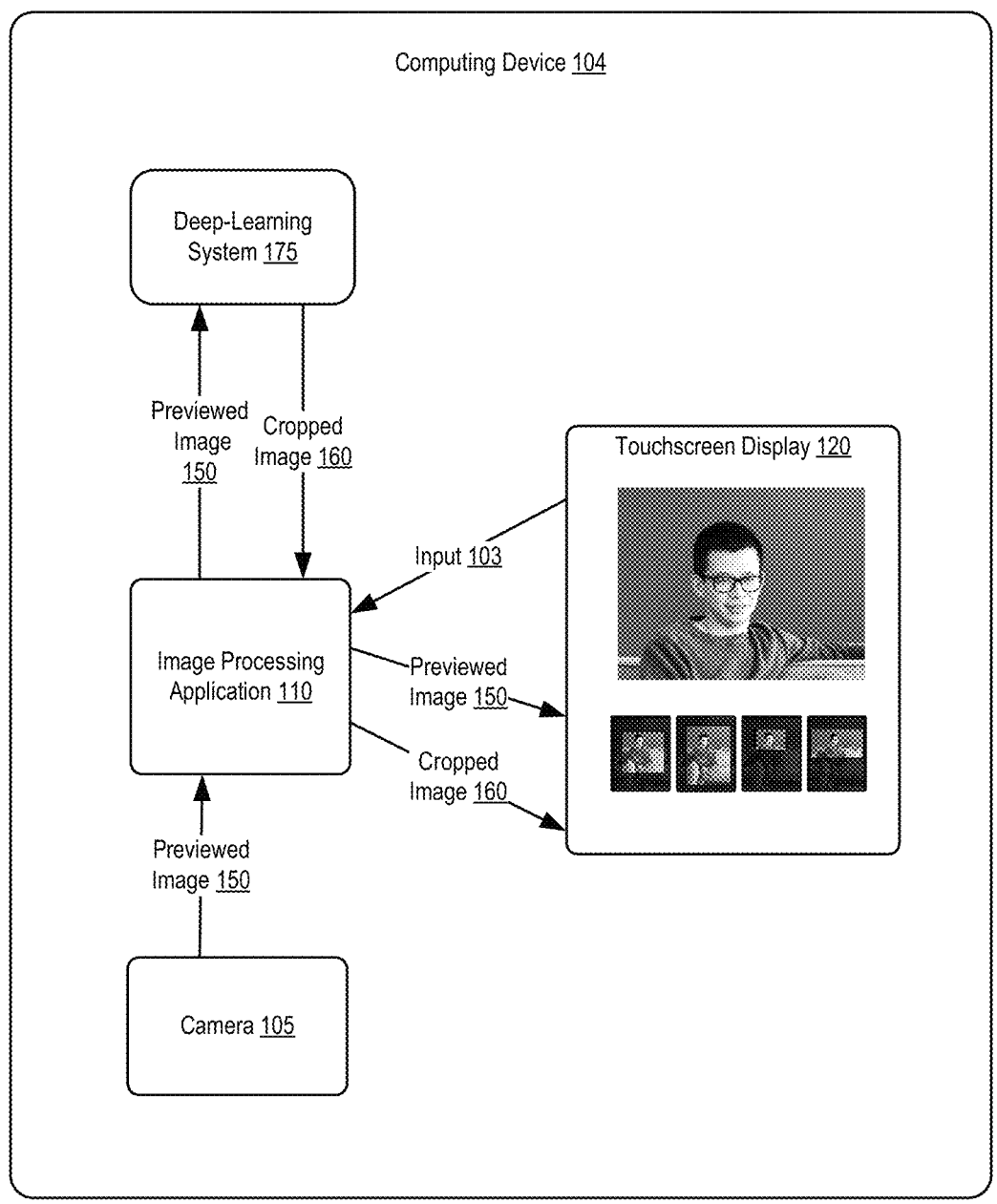
FIG. 1 is a diagram depicting an example computing device for providing guided image composition, according to some embodiments.

Embodiments of the present disclosure include systems and methods for interface design for guided image, e.g., image composition on mobile devices. As discussed above, existing methods present disadvantages because they do not fulfill all the needs of a user seeking to improve his photography and do not use computing resources efficiently. More specifically, prior solutions may require the storage and editing of multiple images to generate a single image with good compositional quality. In contrast, embodiments of the present disclosure can suggest images with improved composition automatically, in-real-time, and without storage in memory by having such images previewed and objectively scored, leading to more consistent results and avoiding an inefficient use of processing and memory. Only when the compositional quality of a previewed image is acceptable, an image is stored therefrom.

Accordingly, certain embodiments described herein provide an intuitive user interface that provides real-time composition suggestions and feedback to the user to allow the user to take better images.

The following non-limiting example is provided to introduce certain embodiments in which a user interface provides guided image composition. An image processing application operating on a computing device receives an image of a scene in real-time from a user's camera. The image processing application causes the previewed image to be displayed prominently on a user interface, for example, in a major view of the interface. The user interface permits the user to improve the composition of images by providing cropped image suggestions from which the user can chose and allowing the user to receive real-time feedback on his image composition.

Continuing with this example, the computing device provides the user a suggestion of a cropped image derived from the previewed image. The cropped image is automatically generated or generated upon the user's request. The cropped image represents an identified improvement in composition in at least one respect. For example, the cropped image represents a better framing of the scene. The cropped image can have a different aspect ratio than the previewed image. Alternatively, the cropped image can be zoomed in, for example, to focus on an particular feature of the scene, but maintain the same aspect ratio as the previewed image. For example, a zoomed image might focus on the head and shoulders of a person, rather than the entire body of the person as shown in the previewed image. The cropped image is displayed on the touchscreen display, for example, in a sub-view of a user interface. If a user selects a suggested cropped image shown in a particular sub-view, the previewed image is replaced with the image from the selected sub-view.

Additionally, a user can request real-time feedback in the form of the composition score of the previewed image. The score can be an absolute score or a score relative to other previewed images. The computing device determines, in real-time, the compositional quality of the previewed image. The compositional quality can be based on features of the image. The user seeks such feedback by invoking a button or using a touchscreen gesture. The feedback updates in real-time based on changes to the previewed image, or the user's selection of a sub-view. The computing device provides an indication as to whether the score is higher or lower than an average composition score.

Continuing with this example, the user can also request that the computing device suggest a cropped image. The computing system can present multiple options in response. A user can swipe left or right in order to toggle between the different suggested cropped images. The suggested cropped images might have different aspect ratios than the previewed image. A user can also swipe up or down to toggle between different intelligent zoom suggestions. For example a swipe up causes the computing device to zoom in, and a swipe down causes the computing device to zoom out of the current previewed image.

In an example, operations such as determining the cropped image or providing real-time feedback based on the previewed image are performed by a deep-learning system. The deep-learning system can operate on the computing device, or on another, remote computing device such as a server. An example deep-learning system is described in U.S. patent application Ser. No. 15/730,564, which is incorporated herein by reference in its entirety. Briefly, the deep learning system includes an evaluation network and a proposal network, both of which are trained to evaluate image compositions. The evaluation network takes an image as an input and outputs an evaluation score that indicates its compositional quality. The proposal network takes an image as an input and outputs as a recommendation image crops from the image and their ranking based on predefined crop areas.

The operations described herein can also be performed on videos. An example system described in U.S. patent application Ser. No. 15/730,632, now issued U.S. Pat. No. 10,257,436, which is incorporated herein by reference in its entirety.

Accordingly, the embodiments described above provide improved systems and methods for guided image composition because they provide real-time feedback and cropped image suggestions to the user via an intuitive user interface. Additionally, embodiments described herein provide efficiency gains such as reducing processing and memory use by facilitating edits in real time by removing the need to save intermediate copies of images.

As used herein, "image processing application" refers to an application executing on a computing device, such as a mobile device, that facilitates taking and editing images or photographs. Adobe Photoshop®, available from Adobe Systems Inc., Mountain View, Calif. is an example of an image processing application.

As used herein, "previewed image" refers to an image displayed in real-time on a computing device. In an example, a previewed image is not stored as a file in memory of the computing device and can be referred to as "image" or "stored image" instead once stored. An image processing application can present the previewed image and, in response, to a user interaction to capture the previewed image, the image processing application stores the image in the memory.

As used herein, "composition score" refers to a numerical score representing the quality of the composition of the image. For example, a composition score can indicate the quality of an image relative to a threshold, which may be represented by a score of one. If a composition score is greater than one, the image may be considered to have a good composition. Conversely, if an image has a composition score less than one, it may be considered to have a bad composition score. Images can be ranked based on their composition score.

As used herein, "composition indicator" refers to a user interface element that is capable of providing feedback as to the quality of an image composition. For example, a composition indicator may represent whether a given image composition is good, bad, above average, or below average.

As used herein, "cropped image" refers to a cropped version of a previewed image, the cropped version representing an improved or alternative composition relative to the previewed image. For example, if an image shows a picture of a person's whole body, a cropped image may be an image of the person's head and shoulders only.

As used herein, "major view" refers to a predominant part of a user interface where an image may be displayed. For example, a major view can be used to present a primary image, such as an image previewed in real-time.

As used herein, "sub-view" refers to a part of a user interface where a smaller version of an in image view may be displayed. For example, a sub-view can be used to present a smaller image such as a cropped image that the user may choose from instead of the previewed image.

As used herein, "preview mode" refers to a mode of operation of a device in which a captured image is displayed on a user interface viewable by a user. In the preview mode, a previewed image is presented in a major view and/or in a sub-view.

Referring now to the drawings, FIG. 1 is a diagram depicting an example computing device for providing guided image composition, according to some embodiments. Environment 100 includes computing device 104. In the example depicted in FIG. 1, a user executes the image processing application 110 on the computing device 104 that includes a camera 105 (or, alternatively, interfaces with a remote camera over a data bus or data network). The image processing application 110 can run in preview mode, providing a real-time preview to the user via the touchscreen display 120 without requiring the user to actually take an image.

The user points the camera 105 to a scene and the image processing application 110 captures image data, e.g., image data, representing a field of view of the camera 105. Without necessitating the user to take an image, the image processing application 110 displays a previewed image of the scene in real-time on the touchscreen display 120. The image processing application 110 sends the previewed image 150 to the touchscreen display 120 where the previewed image 150 is displayed prominently on the user interface, for example, in a major view.

The computing device 104 is configured to provide real-time suggestions to the user about how to improve image composition and can do so in different ways. For example, a cropped image might accentuate or deemphasize part of a scene to obtain a better composition. Several suggested cropped images, for example, each with a different aspect ratio, may be shown to the user. Alternatively, the user can set predefined sizes, and the computing device 104 determines the best cropped image for a given size.

The computing device 104 can use a smart view-finder to provide instant compositional suggestions of cropped images with different aspect ratios, scaled from the previewed image. When the computing device 104 is performing the smart view-finder feature, the user can quickly and easily use touch gestures or other commands to preview and capture different views of a scene.

The computing device 104 can also determine a cropped image based on a smart zoom feature. The smart zoom feature provides the user an easy way to perform content-aware zoom. The computing device 104 can evaluate objects or features captured within the previewed image and then recommend a smart zoom based on those features or objects. For example, if a user points the camera at a person, the smart zoom feature can suggest a cropped image in which the user's face is positioned prominently. Alternatively, the computing device 104 can suggest cropping the previewed image based on a detected distance from the camera to the subject.

In some embodiments, the suggested cropped images are determined by ranking various possibilities for cropped images according to each possibility's composition score and providing the highest-scoring cropped images to the touchscreen display 120. Other methods are possible. For example, a user might constrain the computing device 104 to certain aspect ratios for later printing to a standard size format.

The user can interact with the computing device 104 by providing input 103 to the touchscreen display 120 or by other methods. In some embodiments, the user can invoke composition suggestions. In other embodiments, the suggestions are automatically provided to the user. The touchscreen display 120 is operable to present a user interface that permits the user to interact with the computing device 104 in a variety of manners, such as pressing a button or providing a user gesture to the screen (e.g., such as tap, pinch, stretch, zoom, rotate, swipe, etc.).

More specifically, an operating system or gesture recognition module hosted on the computing device 104 provides data about a detected touch screen gesture on a touch screen of the computing device 104 to the image processing application 110. In turn, the image processing application 110 uses the data to recognize the gesture and perform an image-related operation.

The computing device 104 can map predefined gestures to an appropriate command internally via the use of a table stored in a memory. The table can be accessible to the image processing application and to image-related operations. For example, the image processing application 110 looks up the gesture in a table available from memory in order to determine the user's desired command. The image processing application 110 applies the command as an image-related operation to achieve the user's desired result. For example, the table includes a mapping for each of three kinds of gestures: a swipe left or right, a swipe up or down, and a tap to respective image-related operations. An entry in the table maps a swipe left or right to a specific image-related operation such as iterating through a set of images displayed in sub-views. Another table entry maps a swipe up and a swipe down to a zoom in and zoom out operations respectively. Yet another table entry maps a user tap on a button to an image-related operation for displaying a composition score indicating the composition quality of the currently displayed image.

In other embodiments, additional processing devices such as application processors, or additional applications or an operating system can be used to interpret touch gestures. Additionally, the user can interact with the image processing application 110 by using features designed for accessibility.

Suggestions for cropped images can be displayed on the user interface in different ways. For example, an automatically generated cropped image can be displayed in a sub-view of the user interface on the touchscreen display 120. With the cropped image 160 present on the touchscreen display 120, the user can choose to select the cropped image 160, for example, by providing the an input 103 to the touchscreen display 120. In that case, the image processing application 110 causes the cropped image to be displayed prominently in the major view of the touchscreen display 120. The user can then perform further refinements to the image composition. In other embodiments, for example, if the user chooses request suggestions, the suggested cropped image can be displayed more prominently, e.g., in the major view of the user interface.

A computing device 104 executes the image processing application 110 and can also host a deep-learning system 175, which can perform some or all of the functionality described herein, such as suggesting cropped images or measuring composition scores. In some embodiments, the neural networks of the deep-learning system are trained by a server and, once the training is complete, such neural networks transmitted from the server to the computing device 104. In such embodiments, updates to the deep-learning system can be also pushed to the computing device 104 from the server. In yet other embodiments, the deep-learning system 175 is executed by a server, for example, on a remote device. The computing device 104 and deep-learning system 175 can be connected by a network, for example.

The image processing application 110 receives information about the cropped image from the deep-learning system 175. Various types of information can be received. In some embodiments, the image processing application 110 receives the cropped image itself from the deep-learning system 175. In other embodiments, the deep-learning system 175 sends pixel locations that indicate boundaries a predefined cropped area of the image. For example, the image processing application 110 uses the pixel boundaries to perform a crop operation on the image and generate the cropped image to correspond to the predefined cropped area of the image. In further embodiments, the deep-learning system 175 sends an indicator that indicates the cropped area. For example, the indicator includes an identifier of the cropped area. In these embodiments, the image processing application 110 accesses a table (stored locally to the image processing application 110, locally on the computing device 104, or remotely accessible from a data storage location) that includes an entry for the identifier and an entry for the pixels locations of the cropped area. The image processing application 110 accordingly determines the cropped area from the table and generates the cropped image.

Similar information can be received for multiple cropped images. In this case, the image processing application 110 can selectively present one or more of the cropped images. In some embodiments, the image processing application 110 maintains a user profile that includes user preferences about the number of sub-views. If multiple cropped images are received from the deep-learning system 175 along their compositional scores (or their ranking based such scores), the image processing application 110 selects a number of the cropped images equal to the number of sub-views. The selection is generally for the best received cropped images (e.g., the highest ranked or the ones having the best compositional scores). In another example, if the pixel locations or identifiers of predefined cropped areas are received, the image processing application 110 can select the number of cropped images to generate according to the number of sub-views and the compositional scores and generate the number of cropped areas by using the pixel locations.

In yet another other embodiments, the image processing application 110 need not receive any cropped images or related information from the deep-learning system 175 besides the compositional scores. In these embodiments, the image processing application 110 accesses a table that predefined cropped areas and generates one or more cropped images based on these areas. The image processing application 110 inputs each of the generated cropped images to the deep-learning system 175 and receives its compositional score back. Based on the received compositional scores (e.g., based on the score being higher than a threshold, or being higher than that of another generated cropped image), the image processing application 110 selects one or more of the generated cropped images for presentation in sub-view(s).

Figure 2:
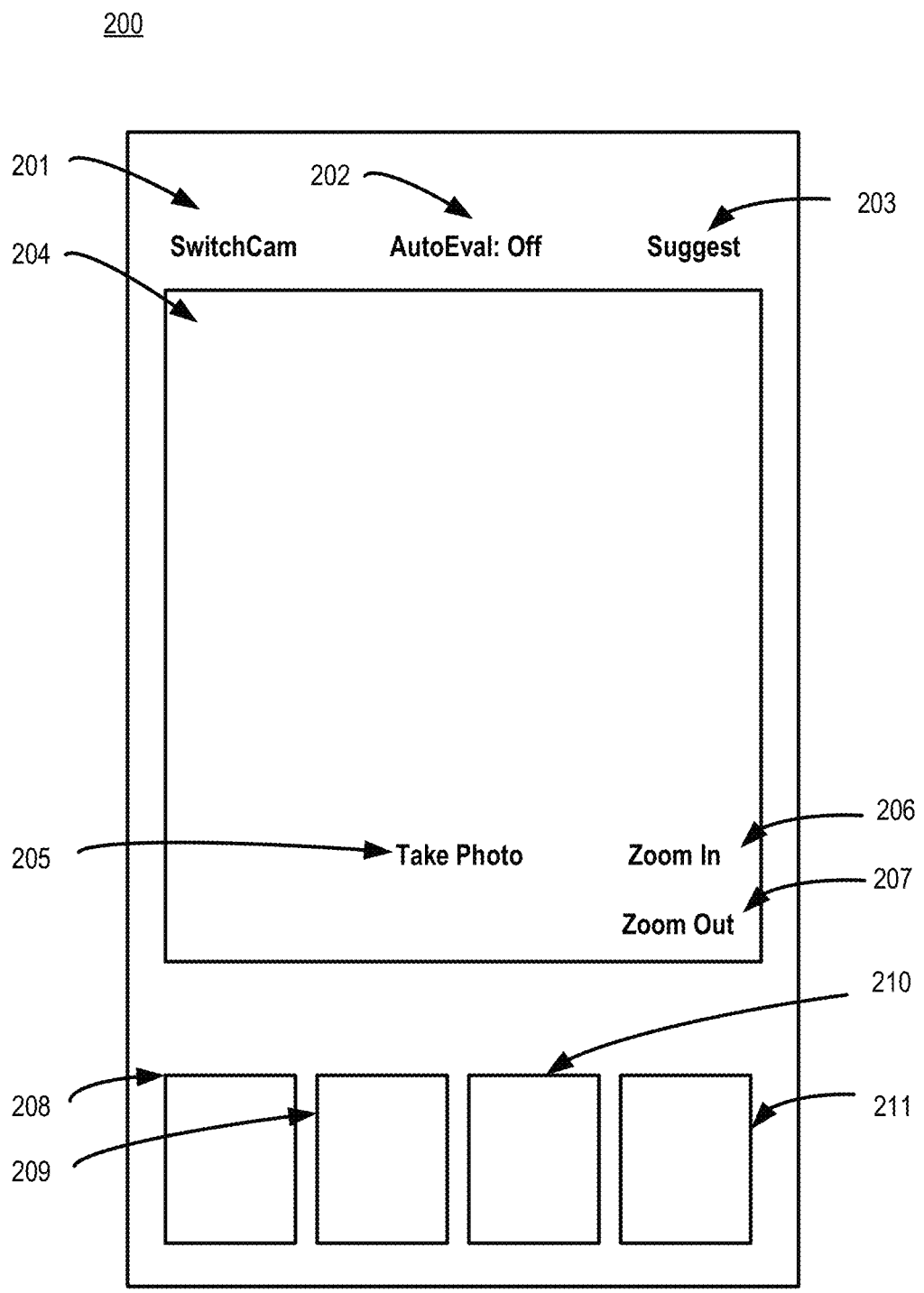
FIG. 2 is a diagram depicting an example user interface for guiding image composition, according to some embodiments.

FIG. 2 is a diagram depicting an example user interface for guiding image composition, according to some embodiments. FIG. 2 depicts a user interface 200 including major view 204, sub-views 208-211, and buttons 201-203 and 205-207. The major view 204 enables an image to be displayed prominently, and is typically larger than sub-views 208-211. Each of the sub-views 208-211 is typically smaller than the major view 204. Each of the sub-views 208-211 can display cropped images suggested by the deep-learning system 170. While four sub-views are shown in FIG. 2, any number of sub-views is possible.

User interface 200 can provide standard image functions. For example, the user can also change the active camera, for example, from a front camera to a back camera or vice versa, by pressing the "SwitchCam" button 201. Other features such as red-eye reduction, touchup, or manual cropping may be available. If the user is satisfied with the previewed image, he selects the "Take Image" button 205.

By interacting with the user interface 200, the user can receive automatic suggestions of cropped images determined by the computing device 104 to have improved composition. For example, the image processing application 110 can display the cropped images in the sub-views 208-211 as suggestions for the user. Each sub-view 208-211 can display a different suggested cropped image available for selection by the user. In some embodiments, each sub-view 208-211 may represent a different predefined aspect ratio. As such, the computing device 104 can only provide cropped images that match the predefined aspect ratios. For example, one sub-view can have a 16:9 aspect ratio, while another can maintain a 4:3 aspect ratio.

The user can select one of the sub-views 208-211 using the touch screen or using another touch gesture. The selected cropped image will be displayed more prominently on the display, for example, in the major view. In some embodiments, one of the sub-views 208-211 may be currently selected. One or more sub-views 208-211 can be highlighted by an identifier. The identifier may indicate particular characteristics about an image in a given sub-view 208-211, for example, that the particular sub-view 208-211 is currently selected. The identifiers can be a box around the corresponding image, a color, shading, etc. The user may then swipe left or right to switch to the sub-view immediately left or right respectively.

The user can interact with the user interface 200 via the touchscreen display 120 in a variety of manners. As discussed herein, the user can manually invoke features such as smart view-finder, smart zoom, or smart eye. In some embodiments, the image processing application 110 can display a previewed image 150 to in the major view 204.

For example, the smart view-finder analyzes the previewed image and determines, in real-time, based on features of the image, intelligent ways to create an image with a better composition based on zooming into or out of the image. The user can obtain smart view-finder suggestions by invoking the "Suggest" button 203. In that case, the image processing application 110 provides the previewed image 150 to the touchscreen display 120. The image processing application 110 determines a cropped image 160 from the previewed image 150.

The user can invoke intelligent zoom features by pressing the "Zoom In" button 206 or the "Zoom Out" button 207. Buttons 206 and 207 cause the image processing application 110 to suggest a cropped image based on intelligent zoom. The content of the previewed image 150 is analyzed in order to make the suggestion. For example, an cropped image that represents an intelligent zoom will attempt to maintain the subject in the picture and correct issues with the composition of the previewed image. If the intelligent zoom feature is invoked, the cropped image 160 can be displayed in the major view 204. Alternatively, one or more cropped image suggestions for intelligently zooming the previewed image can be presented in a sub-view.

The user can also activate the real-time image composition features by interacting with elements of the user interface 200 or by using touch gestures. For example, the user can activate the "AutoEval," or automatic evaluation button 202, to evaluate the composition of the previewed image. Once activated, the AutoEval feature will provide real-time user feedback on the quality of the composition of the previewed image. The real-time compositional quality feedback of the previewed image is determined, for example, based on features of an image. Feedback can include indicating a composition score on the display. Such a score can be an absolute score, or a relative score compared to previous previewed images. Additionally, feedback may be provided by indicating a color prominently on the user interface. Feedback can also be provided to the user in the form of vibration, haptic, or audio feedback.

Figure 3:
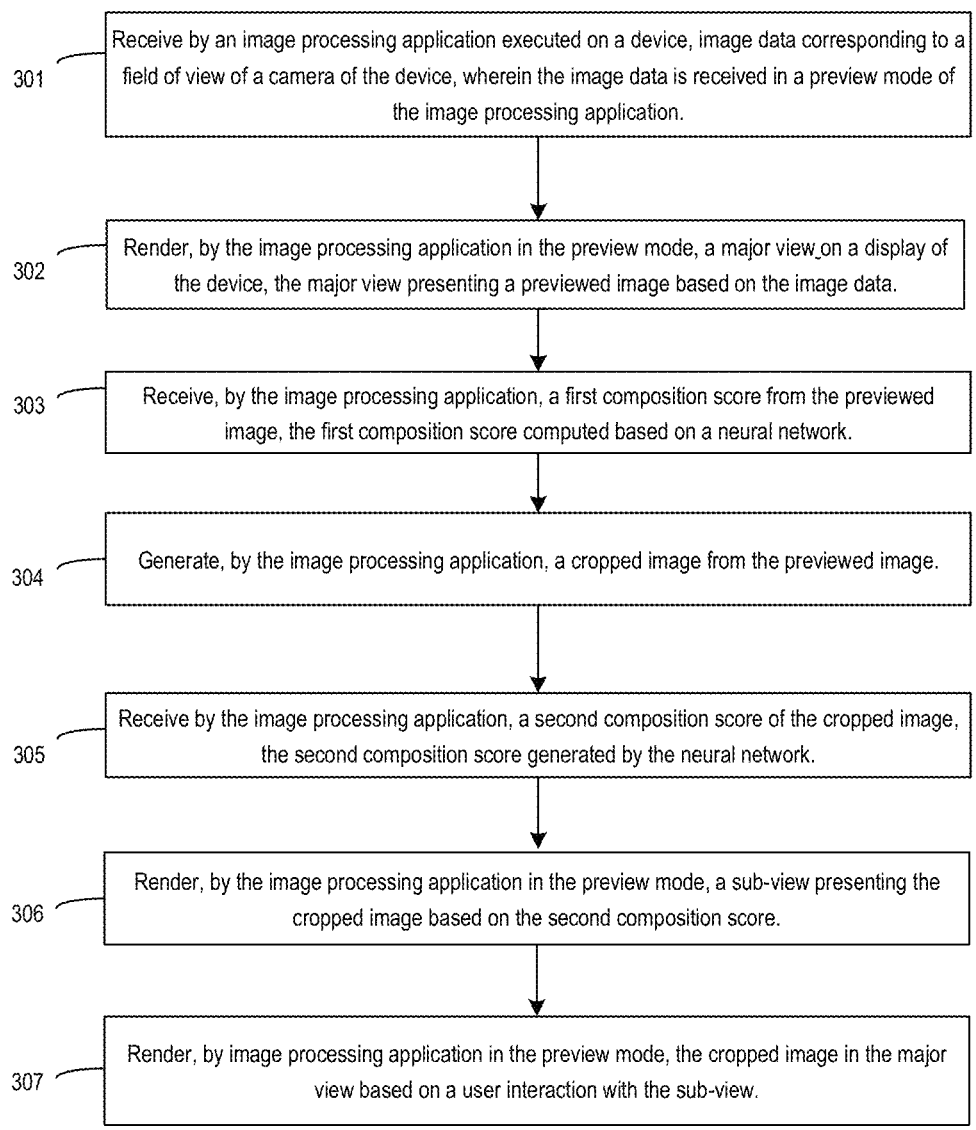
FIG. 3 is a flow chart depicting example operations performed in conjunction with providing guided image composition, according to some embodiments.

FIG. 3 is a flow chart depicting example operations performed in conjunction with providing guided image composition, according to some embodiments. A computing device, such as the computing device 104 of FIG. 1, hosts an image processing application, such as the image processing application 110 of FIG. 1. The computing device may be configured to perform the operations. Instructions for performing the operations can be stored as computer-readable instructions on a non-transitory computer-readable medium of the computing device. As stored, the instructions represent programmable modules that include code or data executable by a processor(s) of the computing device. The execution of such instructions configures the computer system to perform the specific operations shown in the figures and described herein. Each programmable module in combination with the processor represent a means for performing a respective operation(s). While the operations are illustrated in a particular order, it should be understood that no particular order is necessary and that one or more operations may be omitted, skipped, and/or reordered.

At block 301, the method 300 involves receiving, by the image processing application executed on the computing device, image data corresponding to a field of view of a camera of the device. For example, a user activates a computing device and points the camera at a scene. The image processing application captures image data, e.g., image data, representing a field of view of a camera. The user need not take an image because the image data is received in a preview mode of the image processing application. For example, if the user moves the camera, the received image data is updated.

At block 302, the method 300 involves rendering by the image processing application in the preview mode, a major view on a display of the computing device, the major view presenting a previewed image based on the image data. Upon receiving the image data, the image processing application renders the previewed image based on the image data on the major view of the device. The user can thereby visualize the current previewed image, which represents, in real-time, the image as it would be taken.

At block 303, the method 300 involves receiving, by the image processing application, a first composition score from the previewed image, the first composition score computed based on a deep-learning system. As discussed herein, the composition score represents an indication of the quality of the composition of the previewed image.

At block 304, the method 300 involves generating, by the image processing application, a cropped image from the previewed image. In some embodiments, multiple cropped images may be generated. For example, FIG. 2 shows four cropped images, each shown in a different sub-view. The number of cropped images to be generated can be based on a set of user preferences.

The computing device determines a cropped image in different ways. For example, the computing device uses the smart view-finder feature to suggest cropped images of different aspect ratios from the previewed image. The computing device 104 can determine a cropped image based on the smart zoom feature. For example, the cropped image maintains the same aspect ratio as the previewed image but is zoomed in or out depending on aspects within the previewed image. For example, if a user points the camera at a person, the smart zoom feature suggests a cropped image in which the user's face is positioned prominently. In other embodiments, the smart zoom feature crops the previewed image based on a detected distance from the camera to the subject. The cropped image can be based on a predefined cropping location within the previewed image, for example, from a table of predefined cropping locations.

At block 305, the method 300 involves receiving, by the image processing application, a second composition score of the cropped image, the second composition score generated by the deep-learning system. For example, the image processing application receives the second composition score in order to display the composition score on the user interface 200 should the user invoke the smart eye feature.

At block 306, the method 300 involves rendering, by the image processing application in the preview mode, a sub-view presenting the cropped image based on the second composition score. For example, the image processing application may display the cropped image on a sub-view of the user interface. Alternatively, responsive to the user making a selection to invoke the smart view-finder or smart zoom feature, the image processing application can display the cropped image directly on the major view of the user interface.

The user can select one of the cropped images displayed in the sub-views. For example, the image processing application represents the selected cropped image more prominently. At block 307, the method 300 involves rendering, by image processing application in the preview mode, the cropped image in the major view based on a user interaction with the sub-view.

Figure 4:
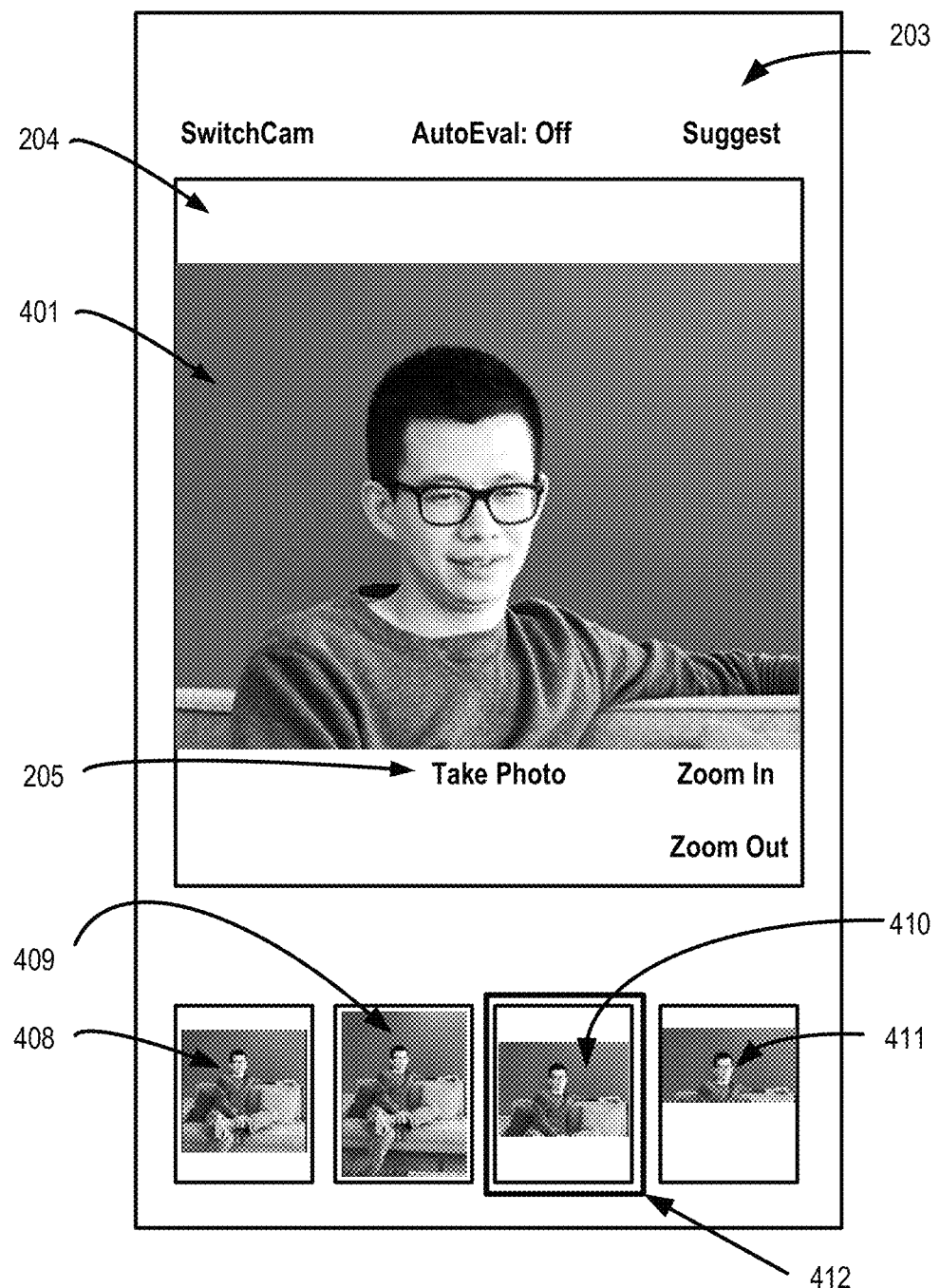
FIG. 4 is a diagram depicting an example user interface with a smart view-finder, according to some embodiments.

FIG. 4 is a diagram depicting an example user interface for using the smart view-finder, according to some embodiments. Smart view-finder user interface 400 provides a mechanism through which a user can interact with computing device 104, receive suggestions for cropped images of different aspect ratios from the previewed image, and switch between suggested images.

The user can select one of the cropped images 408-411. For example, if the user selects cropped image 408, then cropped image 408 is presented in the major view 204. In some embodiments, the previously previewed image is stored in the now vacant sub view 208. In other embodiments, the previously previewed image is discarded. In some embodiments, to assist the user, an indicator box 412 is shown around the sub-view 208-211 that contains the image that is currently rendered in the major view 401. In the current example, indicator box 412 surrounds the cropped image 410, because cropped image 410 is also currently displayed in the major view 401.

The cropped images 408-411 are updated in real-time. Therefore, if the user moves the camera, then the computing device 104 updates sub-views 208-211 with new cropped images 408-411 accordingly.

Figure 5:
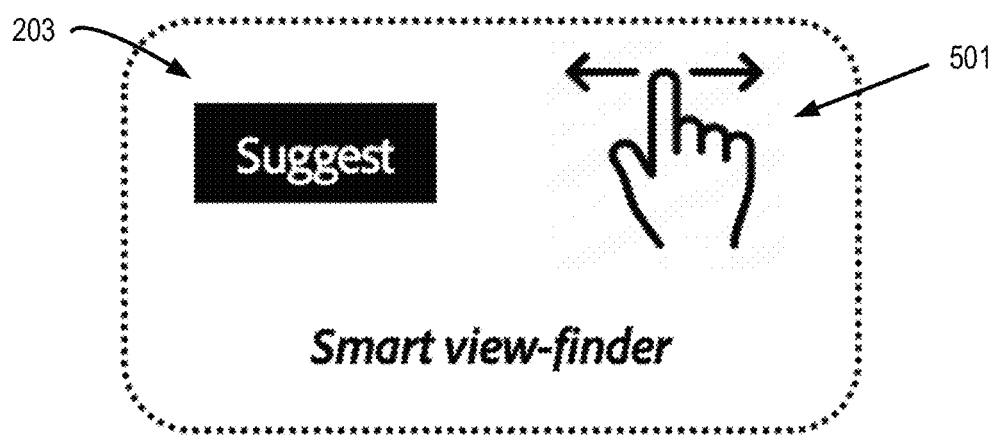
FIG. 5 is a diagram depicting an example gesture for use with a smart view-finder, according to some embodiments.

The user can interact with the smart view finder user interface 400 in different ways, such as by touch gestures or other means. FIG. 5 is a diagram depicting an example gesture for use with a smart view-finder, according to some embodiments. Other methods of interaction are possible. FIG. 5 shows exemplary ways 500 with which a user interacts with the smart view-finder user interface 400. The "Suggest" button 203 provides a direct manner. When the user presses or taps the "Suggest" button 203, the computing device 104 receives a command from the touchscreen display 120 and updates the suggested cropped images 408-

411. The view may be updated (i.e., if the user has moved the camera), or new suggestions may be provided based on the scene. The user can also use the swipe left and swipe right gestures 501 to toggle between suggested cropped images. For example, the user can swipe left to switch the major view 404 to the suggested cropped image immediately to the left or swipe right to switch the major view 404 to the suggested cropped image immediately to the right.

Returning to FIG. 4, in some embodiments, the computing device 104 automatically shows a cropped image with the best compositional score in the major view 204. In other embodiments, the computing device 104 maintains the previewed image 150 in the major view 204 and display the cropped image in one of the sub-views 208-211. In still some embodiments, the sub-views 408-411 shows the proposed crop relative to a complete image of the scene. For example, the part of the complete image which is not contained within the cropped image is darkened.

Figure 6:
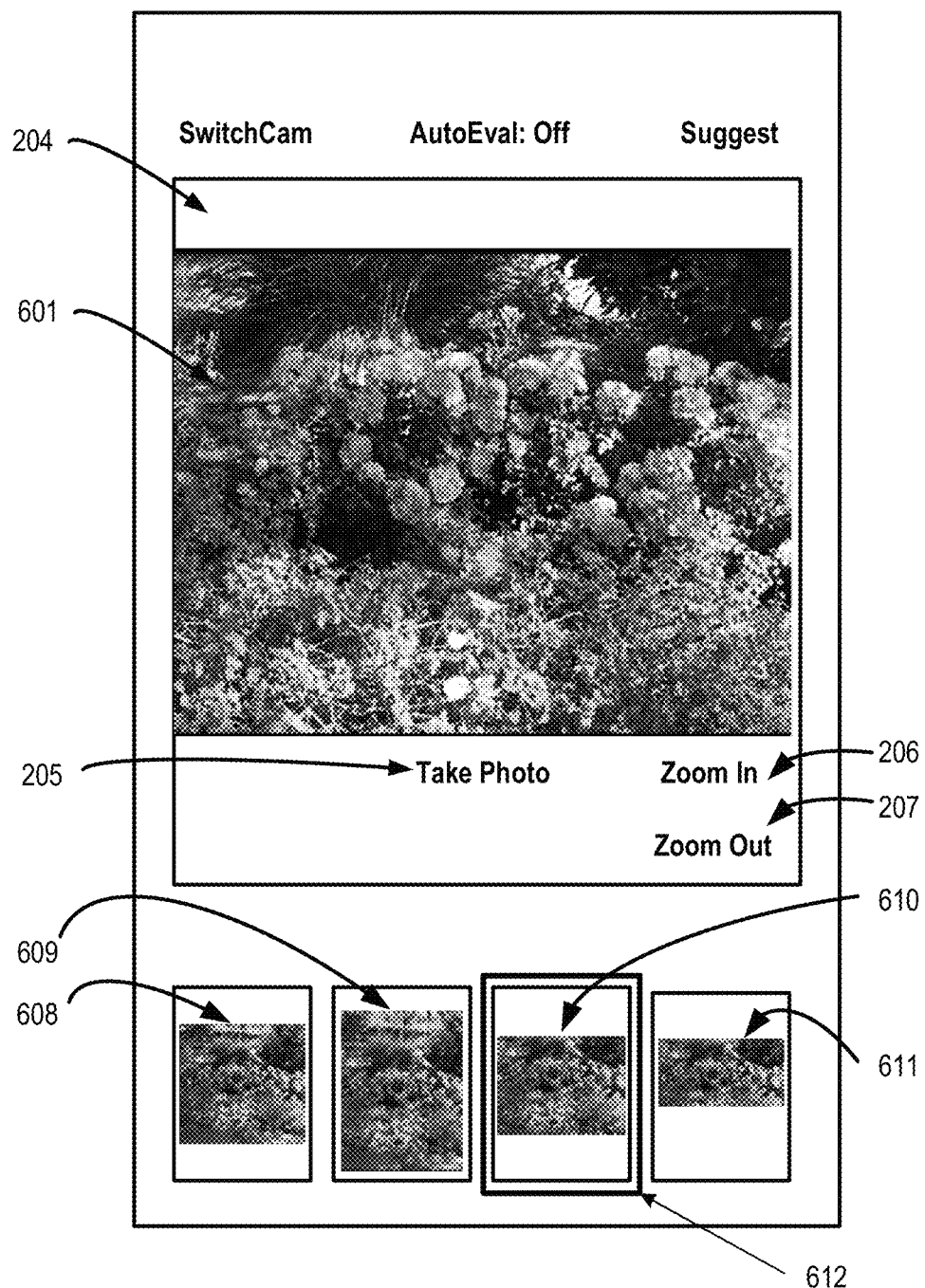
FIG. 6 is a diagram depicting an example user interface with smart zoom, according to some embodiments.

FIG. 6 is a diagram depicting an example user interface with smart zoom, according to some embodiments. Smart zoom user interface 600 provides a mechanism through which a user can interact with computing device 104, receive suggestions for cropped images of different aspect ratios from the previewed image, and switch between suggested images.

For example, a user points his camera at a subject. The computing device 104 causes the image processing application 110 to render the previewed image 601 in the major view 204. The previewed image 601 is updated in real-time. Therefore, if the user moves the camera, then the major view 204, and therefore the previewed image 601 is updated accordingly. The computing device 104 analyzes the previewed image 601, determines, based on features of the image, four cropped images 608-611, and displays the cropped images 608-611 in the sub-views 208-211. Each of the cropped images 608-611 has the same aspect ratio as the original previewed image. In some embodiments, to assist the user, an indicator box 612 is shown around the sub-view 208-211 that contains the image that is currently rendered in the major view 401. In the current example, indicator box 612 surrounds the cropped image 610, because cropped image 610 is also currently displayed in the major view 204.

The user can select one of the cropped images 608-611 to evaluate or use. For example, if the user selects cropped image 608, then cropped image 608 is presented in the major view 204. In some embodiments, the previous previewed image is rendered in the now vacant sub view 208. In other embodiments, the previous previewed image is discarded. The cropped images 608-611 are updated in real-time. Therefore, if the user moves the camera, then the computing device 104 updates sub-views 208-211 with new cropped images 608-611 accordingly.

Figure 7:
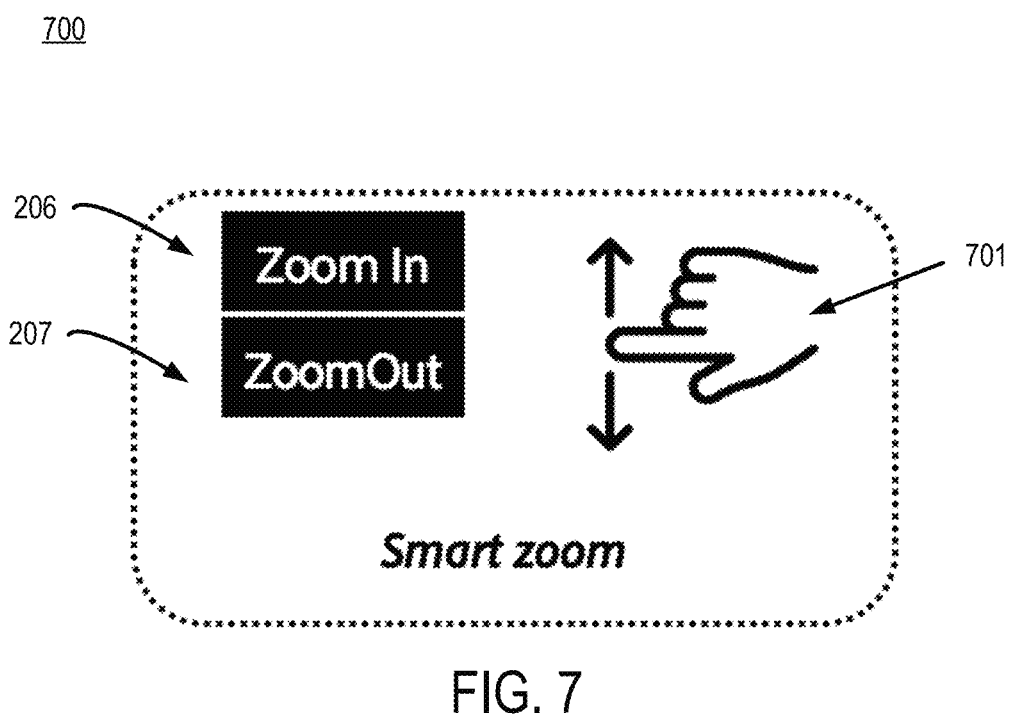
FIG. 7 is a diagram depicting an example gesture for use with smart zoom, according to some embodiments.

The user can interact with the smart zoom user interface 600 in different ways, such as by touch gestures or other means. FIG. 7 is a diagram depicting an example gesture for use with a smart view-finder, according to some embodiments. Other methods of interaction are possible. FIG. 7 shows exemplary ways 700 with which a user can interact with the smart zoom user interface 600. When pressed, or tapped, the "ZoomIn" button 206 causes the computing device 104 to use the smart zoom feature to zoom in. Conversely, when pressed or tapped, the "ZoomOut" button 207 causes the computing device 104 to use the smart zoom feature to zoom out. The user can also use the swipe up and swipe down gestures 701 to use the zoom. For example, the user can swipe up zoom in or swipe down to zoom out.

In some embodiments, the computing device 104 automatically shows the cropped image with the best compositional score in the major view 204. In other embodiments, the computing device 104 maintains the previewed image 150 in the major view 204. In still some embodiments, the sub-views 608-611 shows the proposed crop relative to a complete image of the scene.

Returning to FIG. 6, the resulting cropped image is shown in the major view 204. In some embodiments, one of the sub-views 608-611 shows the cropped image, or the cropped image relative to the original image of the scene. For example, the part of the complete image which is not contained within the cropped image is darkened. In some embodiments, activating the zoom feature does not change the other sub-views (i.e., the sub-views which do not contain the complete image). In this case, the sub-views 208-211 contain cropped images generated from the smart view-finder application. When the user presses the "ZoomOut" button, the previewed image is zoomed out, and the sub-view is similarly updated. When the user presses the "ZoomIn" button, the previewed image is zoomed in, and the sub-view is similarly updated. The computing device 104 evaluates the image from the camera in real-time. Therefore, the computing device 104 updates the view (i.e., if the user has moved the camera), and providing new suggestions based on the scene.

The user can also use the smart view-finder features in conjunction with the smart zoom features. For example, the user can use the swipe left and swipe right gestures 501 to toggle between suggested cropped images displayed in sub-views 208-211. For example, the user can swipe left to switch the major view 604 to the suggested cropped image immediately to the left or swipe right to switch the major view 604 to the suggested cropped image immediately to the right.

Figure 8:
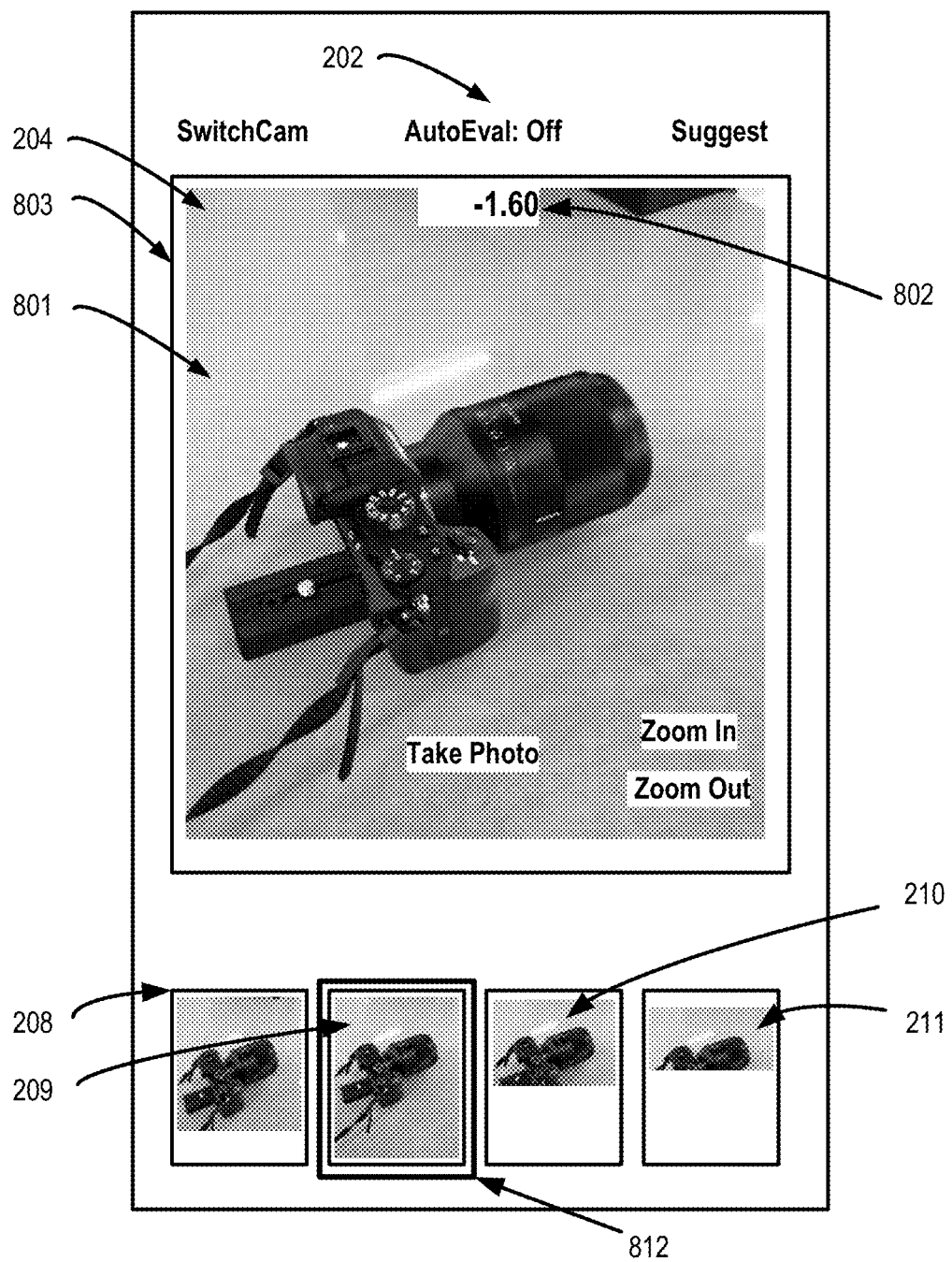
FIG. 8 is a diagram depicting an example user interface with smart eye, according to some embodiments.

FIG. 8 is a diagram depicting an example user interface with smart eye, according to some embodiments. Smart eye provides real-time feedback on the composition of a currently previewed image. The smart eye interface 800 depicts a currently previewed image 804 rendered by the computing device 104 in the major view 204. The smart eye feature can be used in conjunction with the smart view-finder feature, as described with respect to FIG. 4, or the smart zoom feature, as described with respect to FIG. 6.

For example, a user points his camera at a subject. The computing device 104 causes the image processing application 110 to render the previewed image, or previewed image 801 in the major view 204. The previewed image 801 is updated in real-time.

Figure 9:
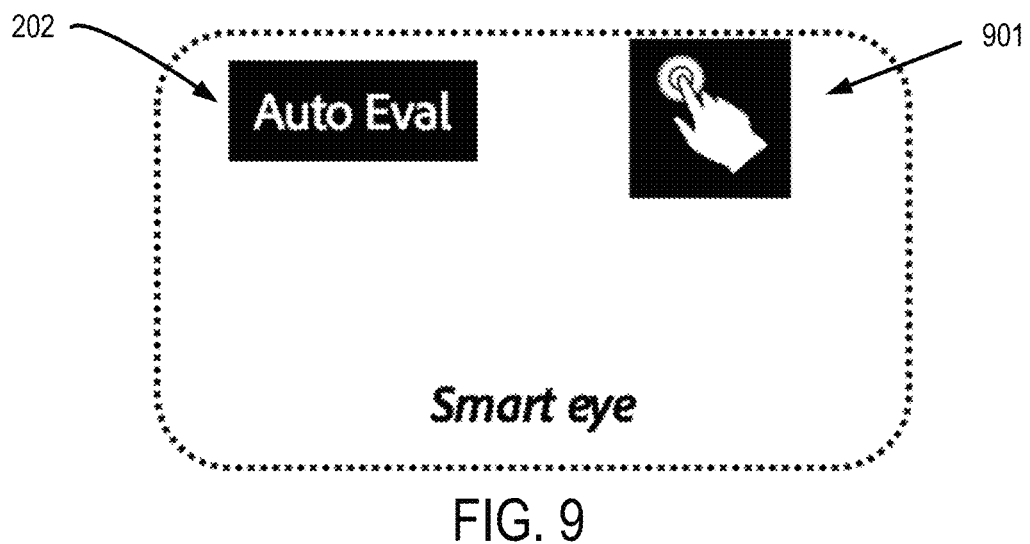
FIG. 9 is a diagram depicting an example gesture for use with smart eye, according to some embodiments.

The user can activate the smart eye features via the smart eye interface 800 by various different means. FIG. 9 is a diagram depicting an example gesture for use with smart eye, according to some embodiments. Other methods of interaction are possible. FIG. 9 shows exemplary ways 900 with which a user can interact with the smart eye interface 800. For example, the user can invoke the "Auto Eval" button 202 to cause the computing device 104 to analyze the previewed image 801 displayed in major view 204 and determines an objective composition score 802. The composition score is based on different factors, such as the overall quality of the image, whether key features are obscured, etc. The computing device displays the composition score within the major view 204. The user can also invoke the smart eye feature by tapping on the major view 204, as shown by tap gesture 901. In some embodiments, to assist the user, an indicator box 812 is shown around one of the sub-views 208-211. In current example, indicator box 812 surround sub-view 209, because the image shown in sub-view 209 is the same image 801 currently shown in the major view 204.

The user can use the composition score 802 as a guide to improve his photography. For example, if the computing device 104 informs the user that the composition score is low, then the user can make adjustments accordingly. For example, the user can move the camera to change the scene. Alternatively, the user can invoke the smart view-finder or smart zoom features in order to receive suggested cropped images with higher composition scores.

In some embodiments, the computing device 104 will provide a relative indicator of composition quality. For example, the computing device 104 determines an average composition score over time, or between different images, or relative to images stored in a database. The computing device 104 indicates the relative composition score, e.g., whether the current composition is greater than or less than the average composition score, by providing an indicator. An indicator could be changing the color of the border 803 around major view 204. For example, a green border could indicate that the currently previewed image has a good composition. Alternatively, a red border could indicate that the currently previewed image has a bad composition relative to other images.

Figure 10:
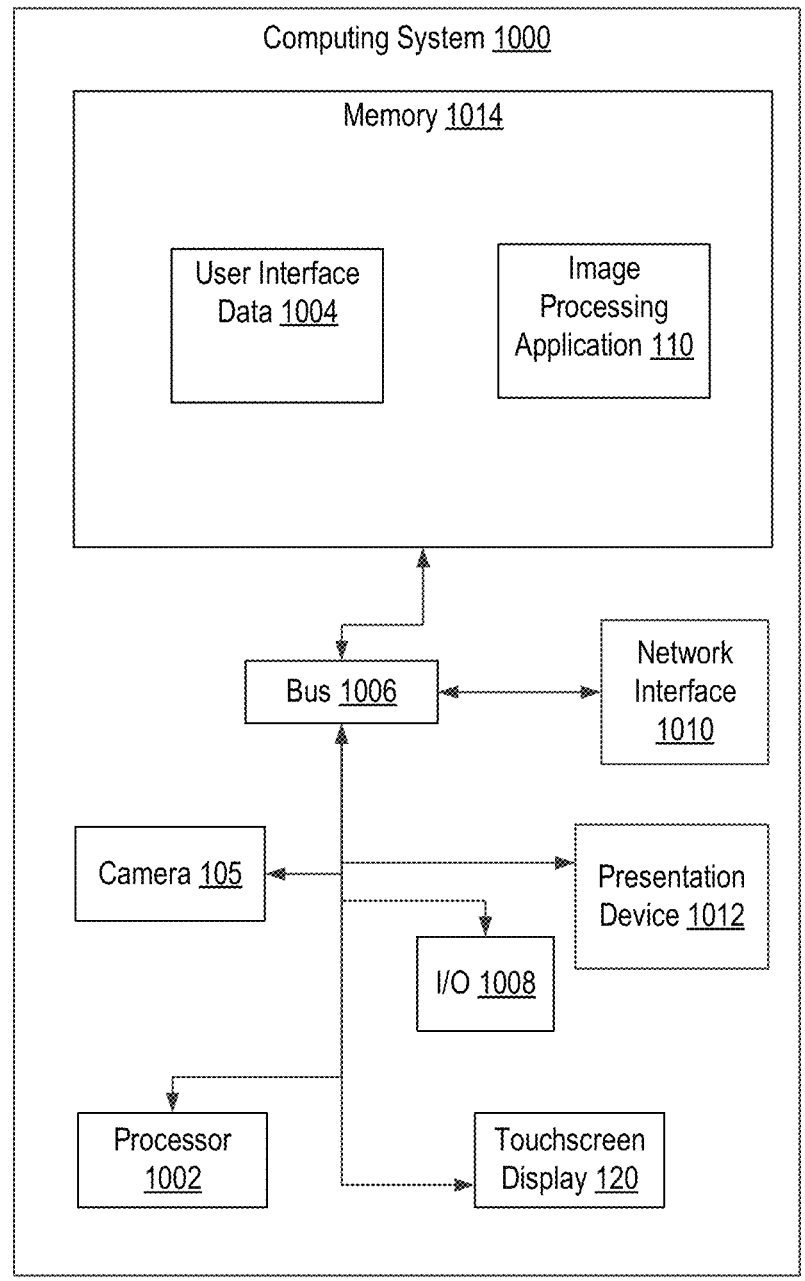
FIG. 10 is a diagram depicting an example computing system for performing guided image composition, according to some embodiments.

FIG. 10 is a diagram depicting an example computing system 1000 for performing guided image composition, according to some embodiments. Some or all of the components of the computing system 1000 can belong to the computing device 104 of FIG. 1. For example, the image processing application 110 may operate on the computing system 1000. The computing system 1000 includes one or more processors 1002 communicatively coupled to one or more memory devices 1014. The processor 1002 executes computer-executable program code, which can be in the form of non-transitory computer-executable instructions, stored in the memory device 1014, accesses information stored in the memory device 1014, or both. Examples of the processor 1002 include a microprocessor, an application-specific integrated circuit ("ASIC"), a field-programmable gate array ("FPGA"), or any other suitable processing device. The processor 1002 can include any number of processing devices, including one.

The memory device 1014 includes any suitable computer-readable medium such as electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 1000 may also include a number of external or internal devices such as input or output devices. For example, the computing system 1000 is shown with an input/output ("I/O") interface 1008 that can receive input from input devices or provide output to output devices. A bus 1006 can also be included in the computing system 1000. The bus 1006 can communicatively couple one or more components of the computing system 1000 and allow for communication between such components.

The computing system 1000 executes program code that configures the processor 1002 to perform one or more of the operations described above with respect to FIGS. 1-9. The program code of the image processing application 110, which can be in the form of non-transitory computer-executable instructions, can be resident in the memory device 1014 or any suitable computer-readable medium and can be executed by the processor 1002 or any other one or more suitable processor. Execution of such program code configures or causes the processor(s) to perform the operations described herein with respect to the computing device 104. In additional or alternative embodiments, the program code described above can be stored in one or more memory devices accessible by the computing system 1000 from a remote storage device via a data network. The computing device 104 and any processes can use the memory device 1014. The memory device 1014 can store, for example, additional programs, or data such as user interface data 1004, used by the applications executing on the processor 1002 such as the image processing application 110. User interface data 1004 can include, for example, a table mapping gestures to commands.

The computing system 1000 also includes at least one network interface 1010. The network interface 1010 includes any device or group of devices suitable for establishing a wired or wireless data connection to one or more data networks. Non-limiting examples of the network interface 1010 include an Ethernet network adapter, a modem, and/or the like. The computing system 1000 is able to communicate with one or more other computing devices or computer-readable data sources via a data network using the network interface 710.

The computing system 1000 includes touchscreen display 120. The touchscreen display 120 provides the user an intuitive way to interact with the computing system 1000 such as by touching, tapping, swiping, or using other suitable gestures to select objects and user interface elements.

The computing system 1000 includes a camera 105, operable to take photographs in real-time.

The computing system 1000 includes a presentation device 1012. A presentation device 1012 can include any device or group of devices suitable for providing visual, auditory, or other suitable sensory output. Non-limiting examples of the presentation device 1012 include a monitor, a speaker, a separate mobile computing device, etc.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes poses of example rather than limitation, and does not preclude the inclusion of such modifications, variations, and/or additions to the present subject matter as would be readily apparent to one of ordinary skill in the art.

The invention claimed is:

1. A computer-implemented method for real-time image cropping, the method comprising:
    rendering, by an image processing application executed on a device, a major view on a display of the device, the major view presenting a previewed image based on image data that corresponds to a field of view of a camera of the device;
    receiving, by the image processing application from a deep-learning system, a composition score for the previewed image;
    rendering, by the image processing application, a sub-view on the display, the sub-view presenting a cropped image generated by cropping the previewed image;
    computing, by the image processing application, an average composition score based on the composition score and subsequent updated composition scores; and
    upon a determination that an updated composition score is greater than the average composition score, displaying, by the image processing application and on the major view, information indicative of a relative compositional quality of the previewed image.

2. The method of claim 1, wherein
    the cropped image is received from the deep-learning system in response to inputting the image data to the deep-learning system, further comprising
    indicating, based on an additional composition score of the cropped image, that the cropped image has a better compositional quality than the previewed image.

3. The method of claim 1, further comprising receiving, from the deep-learning system, an identifier indicating a predefined cropped area in the previewed image.

4. The method of claim 3, further comprising determining, based on the identifier, pixel locations from a lookup table that is accessible to the image processing application, the lookup table comprising an entry for the identifier and an entry for the pixel locations, the pixel locations indicating boundaries of the predefined cropped area.

5. The method of claim 1, wherein the cropped image is generated based on an aspect ratio of the previewed image, and wherein the cropped image comprises a different aspect ratio.

6. The method of claim 1, further comprising receiving a user interaction that comprises a swipe in a predefined direction, wherein the swipe causes the cropped image rendered in the sub-view to be rendered in the major view.

7. The method of claim 6, further comprising a plurality of additional sub-views, each additional sub-view comprising an additional cropped image, and wherein each sub-view is indicated by an identifier surrounding one of the additional cropped images, and wherein receiving the swipe causes a selection of an additional sub-view and the additional cropped image corresponding to the additional sub-view to be rendered within the major view.

8. The method of claim 1, further comprising:
    responsive to a further user interaction, generating, by the image processing application, a new previewed image; and
    updating, by the image processing application based on the new previewed image, the major view and the sub-view according to composition scores generated by the deep-learning system for the new previewed image.

9. The method of claim 1, wherein the cropped image represents a version of the previewed image that is either zoomed in or zoomed out and is generated based on a determined feature of the previewed image, wherein the cropped image and the previewed image have an identical aspect ratio.

10. The method of claim 1, further comprising receiving a user interaction that comprises a swipe in a predefined direction, and wherein the swipe causes the previewed image to be updated with a second previewed image zoomed in or out, the second previewed image based on features of the previewed image.

11. The method of claim 1, further comprising receiving a user interaction and mapping the user interaction to an image-related operation, the mappings comprising (i) a swipe left or right to updating the previewed image with a cropped image displayed in a sub-view, (ii) a swipe up or down to performing a zoom operation, and (iii) a tap on the display to invoking a composition score to be rendered on the display.

12. The method of claim 1, wherein the cropped image comprises a portion of the previewed image, the method further comprising:
    rendering an additional sub-view on the display, the additional sub-view presenting an additional cropped image that comprises an additional portion of the previewed image.

13. The method of claim 12, further comprising:
    displaying a first indication of a composition quality for the cropped image and a second indication of a composition quality for the additional cropped image, wherein the first indication is different from the second indication.

14. A system comprising:
    a camera;
    a display;

a non-transitory computer-readable medium storing computer-executable instructions of an image processing application; and a processing device communicatively coupled to the non-transitory computer-readable medium for executing the computer-executable instructions, wherein executing the computer-executable instructions configures the system to perform operations comprising:

receiving image data corresponding to a field of view of the camera, wherein the image data is received in a preview mode of the image processing application;

rendering, in the preview mode, a major view on the display, the major view presenting a previewed image based on the image data;

receiving, from a deep-learning system, a composition score of a cropped image, the cropped image generated by cropping the previewed image;

rendering, in the preview mode, a sub-view on the display, the sub-view presenting the cropped image; and rendering, in the preview mode, the cropped image in the major view based on a user interaction with the sub-view, wherein the user interaction is (i) a swipe left or right to update the previewed image with a cropped image displayed in a sub-view, (ii) a swipe up or down to perform a zoom operation, or (iii) a tap to display a composition score.

15. The system of claim 14, the operations further comprising:

responsive to a further user interaction, generating, by the image processing application, a new previewed image; and updating, based on the new previewed image, the major view and the sub-view according to composition scores generated by the deep-learning system for the new previewed image.

16. A non-transitory computer-readable storage medium storing instructions for an image processing application, wherein upon execution on a device, the instructions cause the device to perform operations comprising:

receiving image data corresponding to a field of view of a camera of the device, wherein the image data is received in a preview mode of the image processing application;

rendering, in the preview mode, a major view on a display of the device, the major view presenting a previewed image based on the image data;

creating, from the image data, a plurality of cropped images, wherein each of the plurality of the cropped images at least partially overlaps with the previewed image;

receiving, from a deep-learning system, for each of the plurality of cropped images, a respective composition score;

rendering, in the preview mode, each of the cropped images in a respective one of a plurality of sub-views on the display;

and upon a determination that a composition score of one of the cropped images is greater than an average composition score of the composition scores, rendering, in the preview mode, the cropped image in the major view.

17. The non-transitory computer-readable storage medium of claim 16, wherein the operations further comprise:

based on the composition score of the cropped image, indicating on a display that the cropped image has a better compositional quality than an additional cropped image of the plurality of cropped images.

18. The non-transitory computer-readable storage medium of claim 16, further comprising receiving a user interaction that comprises a swipe in a predefined direction, wherein the swipe causes the cropped image rendered in the sub-view to be rendered in the major view.

19. The non-transitory computer-readable storage medium of claim 16, further comprising receiving a user interaction that is mapped, in a table accessible to the image processing application, to an image-related operation, the table comprising an entry mapping (i) a swipe left or right to updating the previewed image with a cropped image displayed in a sub-view, (ii) a swipe up or down to performing a zoom operation, or (iii) a tap on the display to invoking a composition score to be rendered on the display.

* * * * *